US006940614B2

(12) United States Patent
Subramaniam

(10) Patent No.: US 6,940,614 B2
(45) Date of Patent: Sep. 6, 2005

(54) METHOD FOR DEFINING PRINTER DRIVER SETTINGS

(75) Inventor: Thileepan Subramaniam, Singapore (SG)

(73) Assignee: Hewlett-Packard Development Company, L.P., Houston, TX (US)

( * ) Notice: Subject to any disclaimer, the term of this patent is extended or adjusted under 35 U.S.C. 154(b) by 912 days.

(21) Appl. No.: 09/728,665

(22) Filed: Dec. 1, 2000

(65) Prior Publication Data

US 2001/0006423 A1 Jul. 5, 2001

(30) Foreign Application Priority Data

Jan. 5, 2000 (SG) ...................................... 200000006-7

(51) Int. Cl.$^7$ ........................... G06K 15/02; G06F 13/00
(52) U.S. Cl. ..................... 358/1.13; 358/1.14; 358/1.15
(58) Field of Search ............... 358/1.13, 1.14, 358/1.15, 1.9, 1.16, 501, 504, 537, 401, 403; 400/61, 70, 76; 711/163, 164, 152–153

(56) References Cited

U.S. PATENT DOCUMENTS

| | | | |
|---|---|---|---|
| 5,580,177 A | * 12/1996 | Gase et al. | .................... 400/61 |
| 5,991,858 A | * 11/1999 | Weinlander | ................. 711/163 |
| 6,570,668 B1 | * 5/2003 | Misner | ...................... 358/1.15 |

* cited by examiner

*Primary Examiner*—Douglas Tran

(57) ABSTRACT

A method and a network that enable a computer to select a set of printer driver settings for a particular printing application are disclosed. The computer stores sets of printer driver settings in advance. Each set of printer driver settings is tagged with a label that illustrates a general aspect of this set of printer driver settings, and a list of these labels has been created by the computer. When a user fires a printing application, the user makes a selection from the list of these labels first. In response, the computer searches the stored sets of printer driver settings for a conforming set according to the selected label. The conforming set of printer driver settings will be retrieved, either from the memory unit of the computer or from another computer via the network, and used as current printer driver settings for the printing application.

8 Claims, 4 Drawing Sheets

METHOD FOR DEFINING PRINTER DRIVER SETTINGS

BACKGROUND OF THE INVENTION

This invention relates to a technique enabling a computer to select a set of printer driver settings for a printing application. The invention also relates to a technique enabling a computer to retrieve a set of printer driver settings from another computer connected thereto via a network.

Currently, the Microsoft® Windows® operating system, a product of the Microsoft Corporation, Redmond, Washington, allows a computer to define one set of default driver settings for a printer. If the defined set of default printer driver settings is not necessarily suitable for a particular printing application, however, the user needs to get to the printer driver dialog box to modify the printer driver settings. For example, the user may want to print his emails on A4 paper, two-sided printing, medium print quality; but he may want to print his presentations on letter size transparency, best quality. Traditionally, the user needs to go to "printer properties sheet" of the printing application to change each relevant characteristic in the printer driver settings, if current default printer driver settings are not suitable.

Most printer manufactures allow users to save another set of driver settings. Nevertheless, this approach is still not convenient enough. Users cannot create new settings or modify the pre-saved printer driver settings. Particularly, users cannot define a set of printer driver settings to be specific to a particular printing application, that is, this set can only be accessed and used by the particular printing application. Moreover, the fact that only one alternative is available unnecessarily restricts users' choice.

Similar problems exist in a network where a plurality of computers are connected to a printer via the network. Moreover, there will be significant waste of source if common sets of printer driver settings cannot be accessed by all computers.

Therefore, there is a need for a method that provides a computer with alternative sets of printer driver settings for each printing application. There is also a need for a network wherein users of different computers can share sets of public printer driver settings that have been created and stored by a system administrator.

SUMMARY OF THE INVENTION

According to one aspect of the invention, in a preferred embodiment of a method for selecting a set of printer driver settings for a particular printing application, a computer stores sets of printer driver settings in advance. Each set of printer driver settings is tagged with a label that illustrates a general aspect of this set of printer driver settings, and a list of these labels has been created by the computer. When a user fires a printing application, he makes a selection from the list of these labels first. In response, the computer searches the stored sets of printer driver settings for a conforming set according to the selected label. The conforming set of printer driver settings will be retrieved and used as current printer driver settings for the printing application.

Preferably, the user may create or modify a set of printer driver settings according to his printing requirements. He may also associate it with a particular printing application. Hereinafter, this set of printer driver settings will generally only be used by this particular printing application.

According to another aspect of the invention, in a network environment where multiple computers are connected to a printer via the network, users on each computer are able to print to the printer. Each user creates and stores sets of private printer driver settings in his private storage area of one of the computers. Moreover, administrator of the network creates and stores sets of public printer driver settings in a public storage area. Each set of printer settings, stored in either public or private storage area, is tagged with a label that illustrates a general aspect of this set of printer driver settings. Each user is able to access a list that includes labels of all the sets of public printer driver settings and labels of those sets of private printer driver settings that are stored in his own private storage area. When a user fires a printing application, he selects one from the list of labels. Subsequently, the computer that receives the printing application first determines whether the user has selected a set of public printer driver settings or a set of private printer driver settings. If the user has selected a set of private printer driver settings, the computer retrieves a conforming set of printer driver settings from the user's private storage area. Otherwise, the computer will retrieve a conforming set of public printer driver settings from the public storage area via the network.

DETAILED DESCRIPTION OF THE INVENTION

Figure 1:
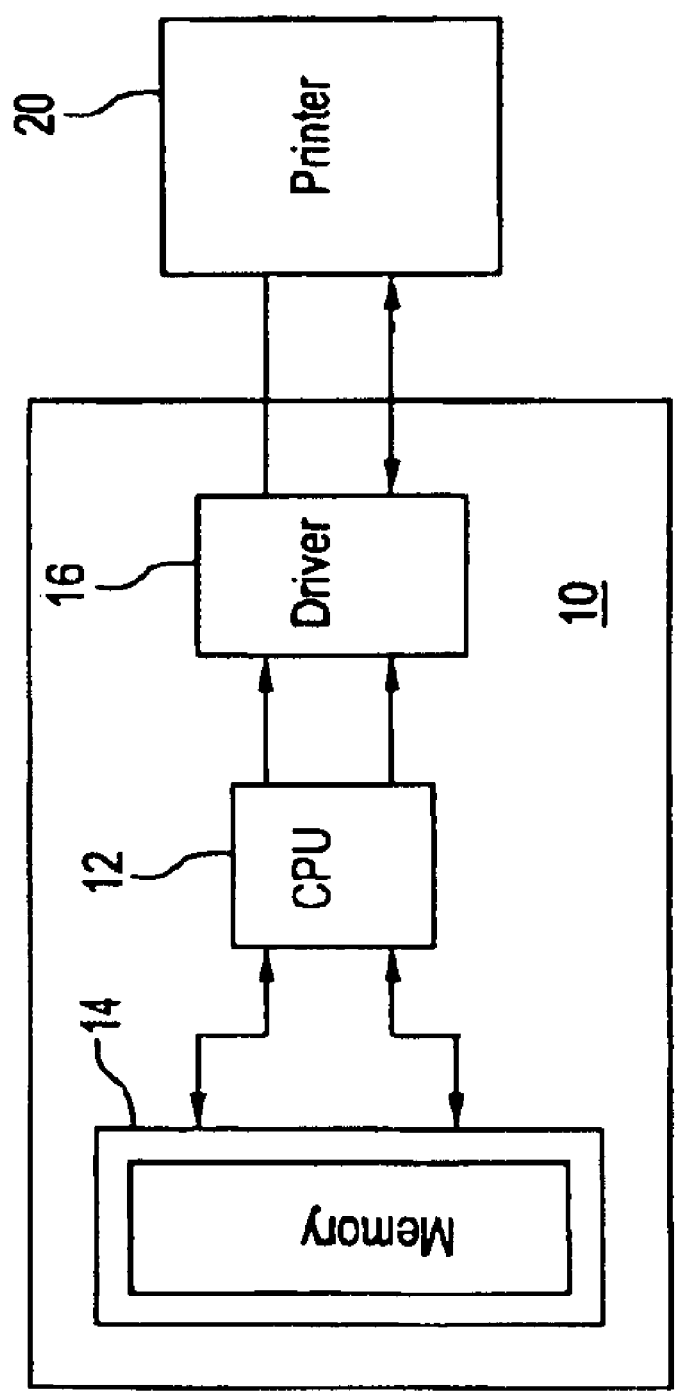
FIG. 1 is a block diagram schematically showing an embodiment of a printing system according to one aspect of the present invention.

As shown in FIG. 1, a computer system 10 for practicing one aspect of the present invention has a central processing unit (CPU) 12 for processing printing applications, a memory unit 14 storing necessary data and programs, and a printer driver 16. The memory unit 14 also stores sets of printer driver settings. The CPU 12 processing printing applications gets an appropriate set of printer driver settings from the memory unit 14 and passes it to the printer driver 16 along with print data. The printer driver 16, which is connected to a printer 20, sends print data to the printer 20 for printing according to the selected printer driver settings.

Hereinafter, the invention will be described in the Microsoft® Windows® environment. Nevertheless, it is to be understood that the invention is equally applicable to other operating systems, such as Windows NT®, MS-DOS®, and Unix®.

Initially, a user (not shown) has created several sets of printer driver settings. Each set is attached with a label that illustrates a general aspect of the set of printer driver settings. For example, the user may create a set of printer driver settings that consists of A4 paper, two-sided printing and medium quality, with a label of "My Emails;" and another set under name "My Reports" that consists of letter size paper, best print quality and two copies. Also, the user has created a list including all the labels attached to the sets of printer driver settings. Whenever a new set of printer driver settings is created and saved, the label of this new set will be added to the list automatically.

When the user invokes a printing application by telling the CPU 12 to load the printing application, the user calls the list of labels by getting to the printer driver dialog of the printing application and selects one that he desired. Subsequently, the printer driver 16 searches the memory unit 14 where all sets of printer driver settings are saved for a suitable one whose label conforms to what the user has chosen from the list. If a matching set of printer driver settings is found in the memory unit 14, the printer driver 16 passes on this set of printer driver settings to the CPU 12. The CPU 12 further passes it back to the printing application. Once the set of printer driver settings requested by the printing application is obtained, the printing application sends the print data to the CPU 12 along with the selected printer driver settings. The CPU 12 in turn passes them to the printer driver 16 from which the print data goes to the printer 20 for printing.

Besides, the user may pre-define certain set(s) to be specific to a particular printing application, that is, a set of printer driver settings that can only be used by that printing application. Preferably, this can be done with the help of the Application Programmer's Interfaces (API) that return the calling application name. In the case of Microsoft® Windows®, GetModuleFileName gives the name of the calling program. For example, the user may define the set of printer driver settings under the name "My Reports" as a set specific to MS-Word. Thereafter, this set under the name of "My Reports" can only be used for printing in the environment of MS-Word. Those sets that are not pre-defined to be specific to a particular printing application are generic to all printing applications; that is, they can be used by all printing applications.

Figure 2:
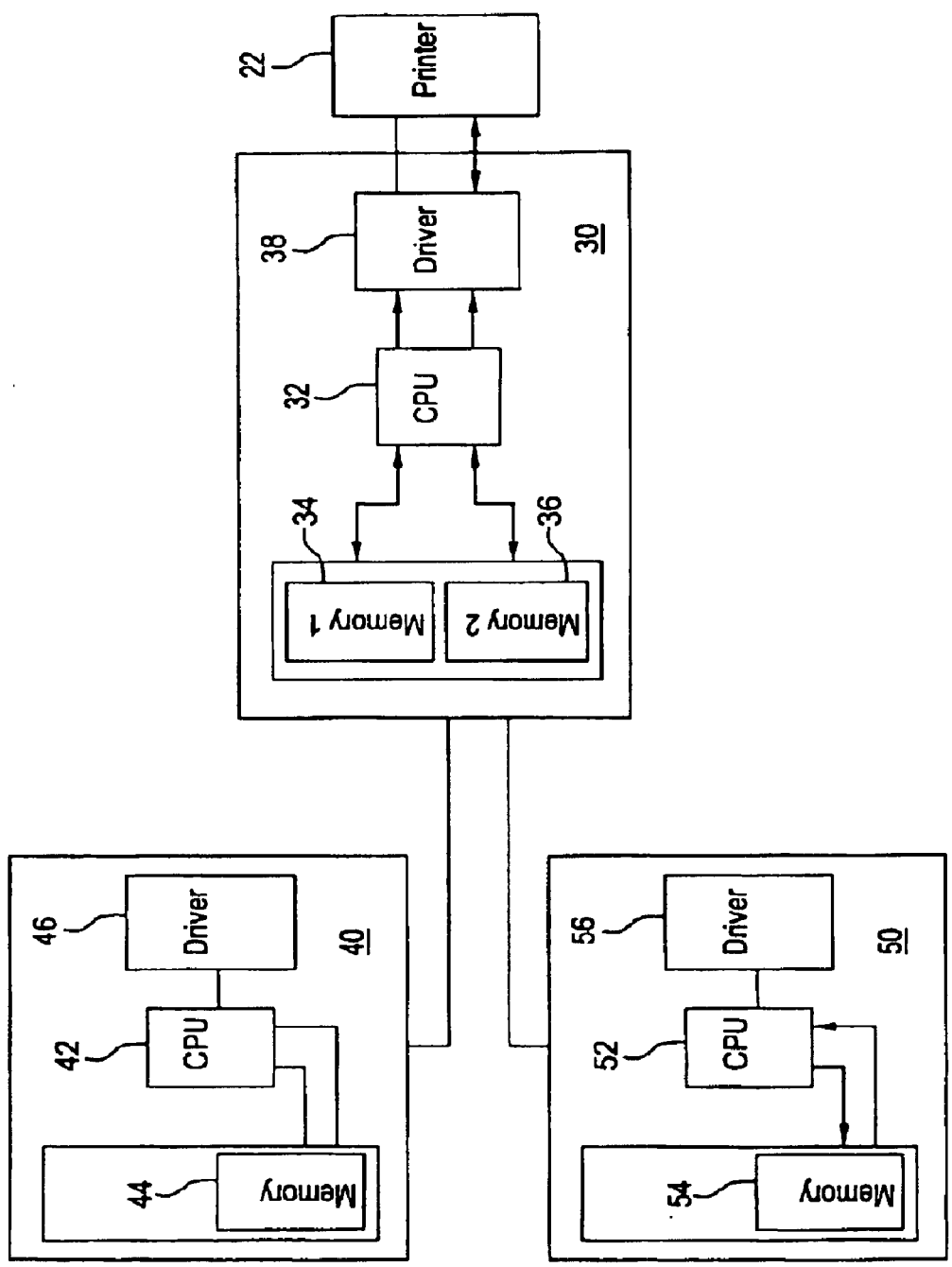
FIG. 2 is a block diagram schematically showing a network according to another aspect of the present invention.

FIG. 2 illustrates a connected environment where a printer 22 is attached to a Windows NT® system and three computer systems 30, 40 and 50 are connected to the Windows NT® system. The host computer system 30 has a host CPU 32, a first memory unit 34 for private storage, a second memory unit 36 for public storage, and a host printer driver 38 to which the printer 22 is connected. The first memory unit 32 stores sets of printer driver settings for printing applications fired by users of the host computer system, while the second memory unit 34 stores sets of public printer driver settings created by the administrator of the network. Each of the client computer systems 40, 50 has a client CPU 42, 52, a client memory unit 44, 54, and a client printer driver 46, 56. Each of the client memory units 44, 54 stores sets of private printer driver settings for its own users respectively.

Similarly, every set of printer driver settings is attached with a label that illustrates a general aspect of this set. Each user is able to access a list of labels that includes labels of all the sets of public printer driver settings and labels of those sets of private printer driver settings that are stored in his own private storage area. Whenever a new set of printer driver settings is created, the new set will be stored in a private storage area and the label of the new set will be added to a list automatically, according to the person who creates it.

When a user of the host computer system 30 fires a printing application, if needed, the host CPU 32 gets an appropriate set of printer driver settings from the first memory unit 32, similarly to the process previously described along with FIG. 1.

In the preferred embodiment, a user of one of the client computer system 40 may also print to the printer 22 by using Windows NT® Point-and-Print method. After a printing application is fired, the user goes to his own list of labels and selects a suitable one. If the user selects a label representing a set of private printer driver settings, the client printer driver 46 searches the client memory unit 44 according to the label that the user has selected. The conforming set of private printer driver settings will be retrieved and used for current printing action. If the user needs a set of public printer driver settings that has been created by the administrator of the network and shared out, however, a conforming set of public printer driver settings will be retrieved from the second memory unit 36 by the client CPU 42 calling the host CPU 32. Once the printer driver settings are finalized, the print data will be sent to the host CPU 32 along with the selected printer driver settings. The host CPU 32 further passes them on to the host printer driver 38, which sends the print data to the printer for printing.

Figure 3:
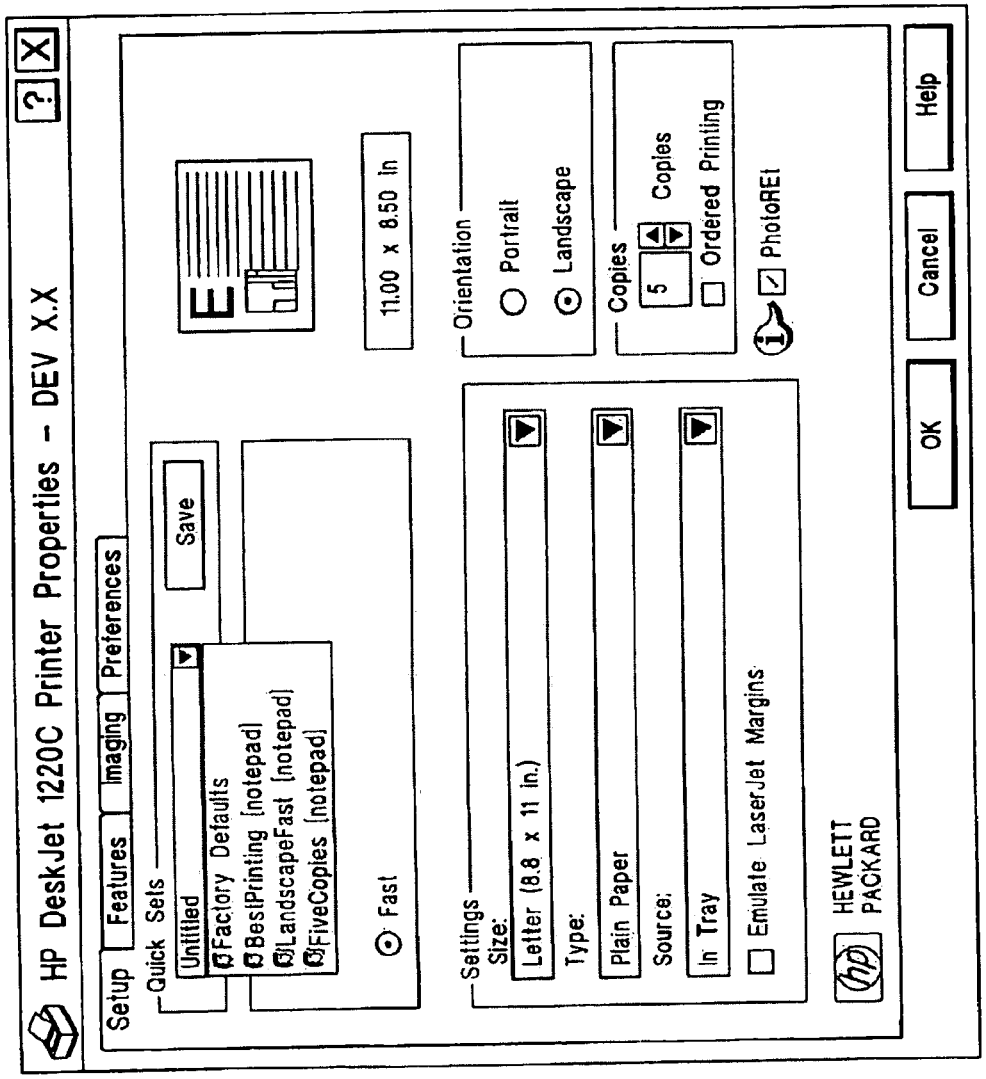
FIG. 3 illustrates a printer driver dialog box through which printer driver settings can be edited.
Figure 4:
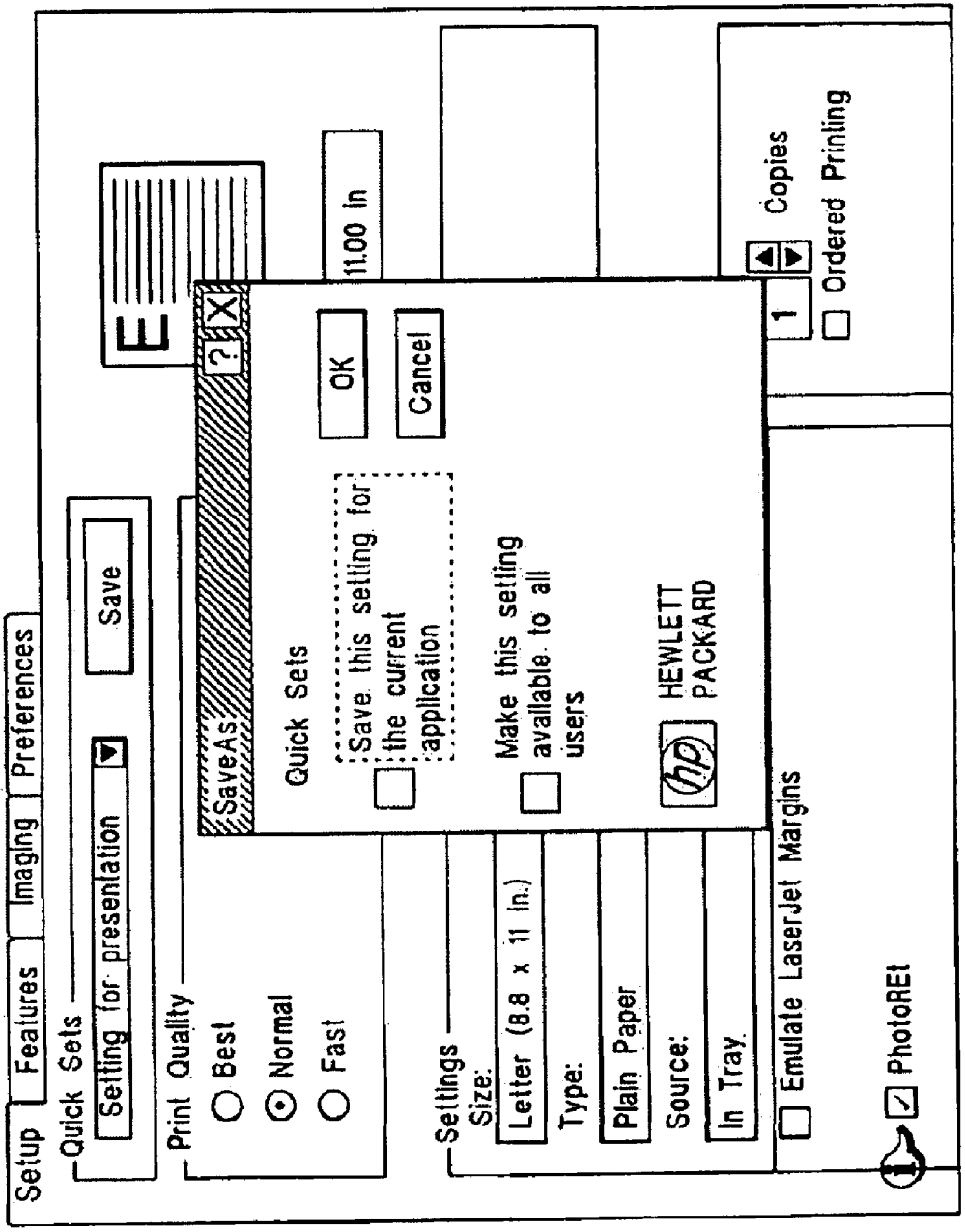
FIG. 4 illustrates another printer driver dialog box through which a set of printer driver settings can be defined to be specific to a printing application.

Users may create or modify a set of printer driver settings through a printer driver dialog box as shown in FIG. 3. Whenever a set of printer driver settings needs to be modified or the user wants to create a new one, the user may go to the printer driver dialog box. Then the user may edit the printer driver settings, such as paper size, paper type, paper source, orientation, copies, and attaches this set of printer driver settings with a label which is defined by the category of "Quick Sets". The label functions as illustrating the general aspect of this set and being used to search for a set of printer driver settings selected by the user. After making all necessary changes to the printer driver settings, the user clicks the "Save" button and this set of printer driver is then saved. If the user is in the environment of a printing application, another dialog box (see FIG. 4) will be brought up to ask whether the user wants to define this set of printer driver settings only for the current application or for all applications. If the user selects 'yes' to define this set specific to the printing application, the filename of the printing application will be piggybacked to the set of printer driver settings and this set of printer driver settings hereinafter can only be used for this particular printing application. Particularly, in the preferred embodiment, standard Windows® API GetModuleFileName is used to get the printing application's filename and tag it with the set of printer driver settings.

If it is the administrator who is using the host computer system 30, then the dialog box will further ask him whether he wants the settings to be a set of public printer driver settings or not. If the administrator selects it to be a public one, then this set of printer driver settings will be stored in a public place, i.e., the second memory unit 36. Thereafter, this set of printer driver settings becomes a set of public printer driver settings that can be accessed by other computers in the network. Otherwise it will be stored in a non-public memory location, i.e., the first memory unit 34. Preferably, saving the settings into the memory can be accomplished in the Windows® environment with the RegSetValueEx and SetPrinterData APIs, and reading the values from the memory can be done with the help of RegQueryValueEx and GetPrinterData APIs.

What is claimed is:

1. A network for enabling sets of public printer driver settings being shared out, comprising:

a host computer having a public memory unit for storing sets of public printer driver settings; and at least one client computer connected to the host computer via the network, wherein upon a printing application being fired in the client computer, the client computer retrieves an appropriate set of public printer driver settings from the public memory unit by calling the host computer, wherein the client computer has a client memory unit for storing sets of private printer driver settings for users of the client computer, and wherein each set of public printer driver settings or private printer driver settings is attached with a respective label that indicates its general aspect.

2. The network of claim 1, wherein the host computer further has a host private memory unit for storing sets of private printer driver settings for administrators of the host computer.

3. The network of claim 1, wherein the client memory unit has a plurality of private storage area for the users, a first user being able to access a personal private storage area.

4. The network of claim 3, wherein the first user creates a personal list that includes labels of all the sets of public printer driver settings and labels of those sets stored in the personal private storage area.

5. The network of claim 4, wherein when a printing application is fired on the client computer, the first user selects a first label from the personal list.

6. The network of claim 5, wherein if the first label represents a particular set of public printer driver settings, the client computer retrieves the particular set of public printer driver settings from the public memory unit by calling the host computer.

7. The network of claim 5, wherein if the first label represents a particular set of private printer driver settings, the client computer retrieves the particular set of private printer driver settings from the personal client private storage area.

8. The network of claim 1, further comprising a printer connected to the host computer, wherein the client computer prints to the printer via the network.

* * * * *